(12) United States Patent
Akasaka

(10) Patent No.: US 9,751,473 B2
(45) Date of Patent: Sep. 5, 2017

(54) CARPET WITH WIRE HARNESS AND MANUFACTURING METHOD OF CARPET WITH WIRE HARNESS

(71) Applicant: SUMITOMO WIRING SYSTEMS, LTD., Mie (JP)

(72) Inventor: Mitsuhiro Akasaka, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 0 days.

(21) Appl. No.: 14/897,900

(22) PCT Filed: Jun. 2, 2014

(86) PCT No.: PCT/JP2014/064568
§ 371 (c)(1),
(2) Date: Dec. 11, 2015

(87) PCT Pub. No.: WO2014/203710
PCT Pub. Date: Dec. 24, 2014

(65) Prior Publication Data
US 2016/0121819 A1    May 5, 2016

(30) Foreign Application Priority Data
Jun. 21, 2013    (JP) .................................. 2013-130445

(51) Int. Cl.
*B60R 16/02*    (2006.01)
*B60N 3/04*    (2006.01)

(52) U.S. Cl.
CPC .......... *B60R 16/0207* (2013.01); *B60N 3/042* (2013.01); *B60N 3/046* (2013.01); *B60R 16/0215* (2013.01)

(58) Field of Classification Search
CPC . B60R 16/0207; B60R 16/0215; B60N 3/046; B60N 3/042

(Continued)

(56) References Cited

U.S. PATENT DOCUMENTS 4,588,628 A * 5/1986 Roth .................. A47G 27/0412
296/97.23
6,062,633 A * 5/2000 Serizawa ............ B60R 16/0215
296/199

(Continued)

FOREIGN PATENT DOCUMENTS

JP        7-315102        12/1995
JP      2004-122809        4/2004

(Continued)

OTHER PUBLICATIONS

Search Report issued by PCT/JP2014/064568 patent office in PCT/JP2014/064568 Patent Application No. , dated Aug. 5, 2014.

*Primary Examiner* — Jason S Morrow
*Assistant Examiner* — E Turner Hicks
(74) *Attorney, Agent, or Firm* — Greenblum & Bernstein, P.L.C.

(57) ABSTRACT

A technology attaching a wire harness and a carpet to a vehicle body panel at a low cost is provided. A carpet with wire harness includes: a carpet main body; a wire harness arranged on the carpet main body; a retaining tab having a portion near a base end connected to the carpet main body and, together with the carpet main body, wrapping up and holding the wire harness by folding back a portion near a forefront end of the retaining tab; and an attachment portion attaching the retaining tab to the carpet main body by passing an insertion portion through the carpet main body and a portion of the retaining tab nearer to the forefront end than the portion covering the wire harness. The carpet main body is attached to a vehicle body panel by inserting the insertion portion through the vehicle body panel.

9 Claims, 3 Drawing Sheets

(58) Field of Classification Search
USPC .......................... 296/97.23, 208, 1.06, 1.08
See application file for complete search history.

(56) References Cited

U.S. PATENT DOCUMENTS

| | | | |
|---|---|---|---|
| 7,140,070 B2* | 11/2006 | Yuta | B60N 3/046 |
| | | | 16/17 |
| 8,157,222 B1* | 4/2012 | Shirey | H02G 3/263 |
| | | | 248/68.1 |
| 8,668,253 B2* | 3/2014 | Bauer | B60R 16/0215 |
| | | | 296/1.08 |
| 2004/0108421 A1 | 6/2004 | Yuta et al. | |

FOREIGN PATENT DOCUMENTS

| JP | 2010-173475 | 8/2010 |
|---|---|---|
| JP | 2011-213172 | 10/2011 |

\* cited by examiner

CARPET WITH WIRE HARNESS AND MANUFACTURING METHOD OF CARPET WITH WIRE HARNESS

FIELD OF THE INVENTION

The present invention relates to a carpet with wire harness.

BACKGROUND OF THE INVENTION

A technology fixating a wire harness and a carpet to a vehicle body panel such as a locker panel has been suggested previously (e.g., Patent Literature 1).

Patent Literature 1 discloses a carpet fastener fixating a wire harness and a carpet to a locker panel. More specifically, the carpet fastener includes a harness holder, an insertion opening, and an engagement projection. The wire harness is fixated to the harness holder. In addition, the carpet fastener is fixated to the locker panel by inserting an insertion portion into an attachment hole of the locker panel. Accordingly, the wire harness is also fixated to the locker panel. Moreover, the carpet is fixated to the locker panel by inserting the engagement projection into an engagement hole of the carpet.

In this way, the carpet and wire harness can be integrally fixated to the locker panel with the carpet fastener described in Patent Literature 1.

RELATED ART

Patent Literature

Patent Literature 1: Japanese Patent Laid-open Publication No. 2011-213172

SUMMARY OF THE INVENTION

Problems to Be Solved by the Invention

However, the carpet fastener described in Patent Literature 1 fixates the carpet to the locker panel via two fixation portions (the insertion portion and the engagement projection). Therefore, in the case of a conventional carpet fastener, processing is required to provide a plurality of fixation portions corresponding to the holes formed in each of the carpet and the locker panel. Therefore, a decrease in manufacturing costs has been sought.

The present invention has been conceived in view of the above-noted issues and provides a technology which attaches a wire harness and a carpet to a vehicle body panel at a low cost.

Means for Solving the Problems

In order to resolve the above-noted issues, a first aspect is a carpet with wire harness attached to a vehicle body panel, the carpet with wire harness including: a carpet main body; a wire harness arranged on the carpet main body; a retaining tab having a portion near a base end connected to the carpet main body and, together with the carpet main body, wrapping up and holding the wire harness by folding back a portion near a forefront end of the retaining tab; and an attachment portion attaching the retaining tab to the carpet main body by passing an insertion portion through the carpet main body and a portion of the retaining tab nearer to the forefront end than the portion covering the wire harness. The carpet main body is attached to the vehicle body panel by inserting the insertion portion through the vehicle body panel.

In addition, a second aspect is the carpet with wire harness according to the first aspect, in which a portion of the retaining tab near the base end is integral with the carpet main body.

In addition, a third aspect is the carpet with wire harness according to one of the first and second aspects, in which a through-hole is formed in the carpet main body, a narrow slot extending at least from near the base end of the retaining tab toward the forefront end is formed in the retaining tab, and the insertion portion is inserted through the through-hole and the narrow slot.

In addition, a fourth aspect is the carpet with wire harness according to any one of the first through third aspects, in which the attachment portion further includes: a plate-shaped head provided to a base end side of the insertion portion; and a clip portion attached to the insertion portion and holding the carpet main body and the retaining tab between the clip portion and the head.

In addition, a fifth aspect is the carpet with wire harness according to the fourth aspect, in which a pointed projection is provided to a surface of the clip portion facing the head.

In addition, a sixth aspect is the carpet with wire harness according to one of the fourth and fifth aspects, in which the head is arranged on an obverse side of the carpet main body.

In addition, a seventh aspect is a manufacturing method of a carpet with wire harness attached to a vehicle body panel, the method including: (a) a step of wrapping up a wire harness arranged on a carpet main body using, together with the carpet main body, a retaining tab having a portion near a base end connected to the carpet main body; and (b) a step of attaching the retaining tab to the carpet main body by passing an insertion portion through the carpet main body and a portion of the retaining tab nearer to a forefront end than the portion covering the wire harness. The carpet main body is attached to the vehicle body panel by inserting the insertion portion through a hole formed in the vehicle body panel.

Effect of the Invention

According to the first through seventh aspects, holding of the wire harness and fixation of the carpet main body to the vehicle body panel can be performed using a single insertion portion. Therefore, manufacturing costs of an attachment component can be controlled.

According to the second aspect, by making the portion of the retaining tab near the base end and the carpet main body integral, a task connecting the portion of the retaining tab near the base end to the carpet main body can be omitted.

In addition, according to the third aspect, by providing the through-hole and the narrow slot, the insertion portion can be readily inserted through the carpet main body and the retaining tab. In addition, the narrow slot extends from near the base end of the retaining tab toward the forefront end; thus, a position where the insertion portion is inserted can be adjusted. Accordingly, a size of a ring formed by the retaining tab and the carpet main body can be adjusted. Therefore, wire harnesses of various girths can be accommodated.

In addition, according to the fourth aspect, loss of fixation between the carpet main body and the retaining tab during a time up until the carpet main body is attached to the vehicle body panel can be inhibited.

Also, according to the fifth aspect, the pointed projection more readily sinks into the retaining tab or the carpet main body. Accordingly, the carpet main body and the retaining tab can be firmly held between the head and the clip member.

In addition, according to the carpet with wire harness according to the sixth aspect, protrusion of the insertion portion toward a cabin interior due to the carpet main body, which is attached to the vehicle body panel, being stepped on by a foot can be inhibited.

MODE FOR CARRYING OUT THE INVENTION

Figure 1:
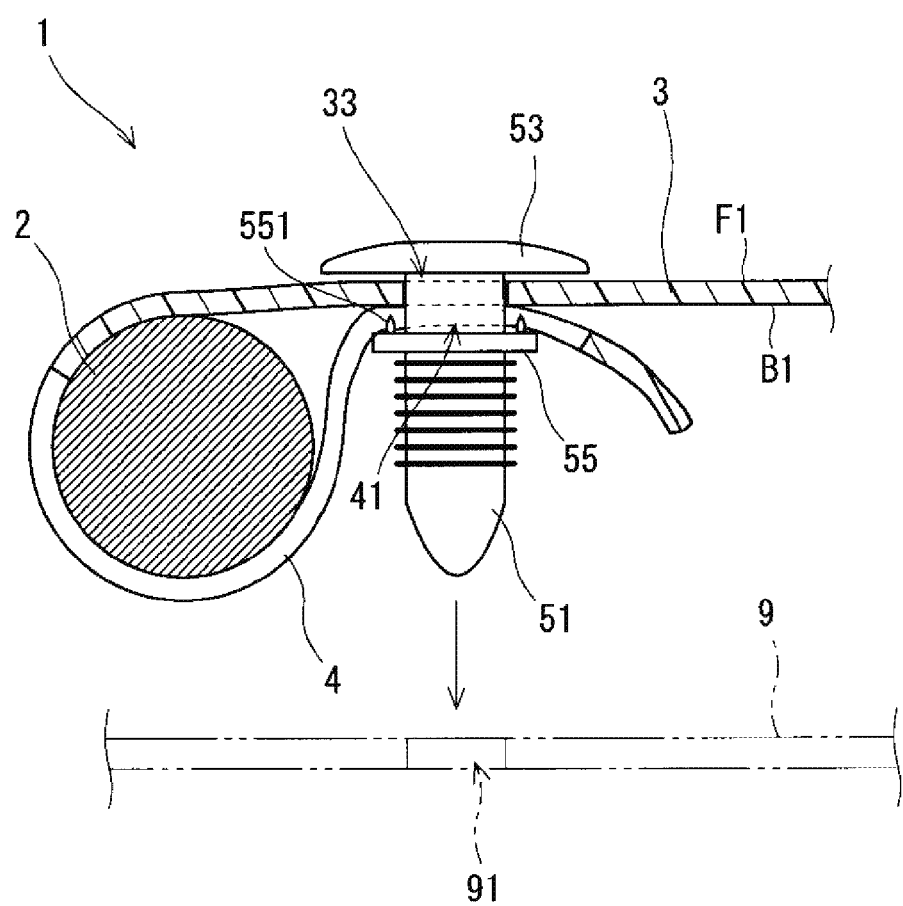
FIG. 1 is a cross-sectional, expanded view of an edge portion of a carpet with wire harness according to an embodiment.

Hereafter, an embodiment of the present invention is described with reference to the drawings. Moreover, in the drawings, dimensions and numbers of various portions may be represented in an exaggerated or simplified form as necessary in order to facilitate understanding.

[1. Embodiment]

Figure 2:
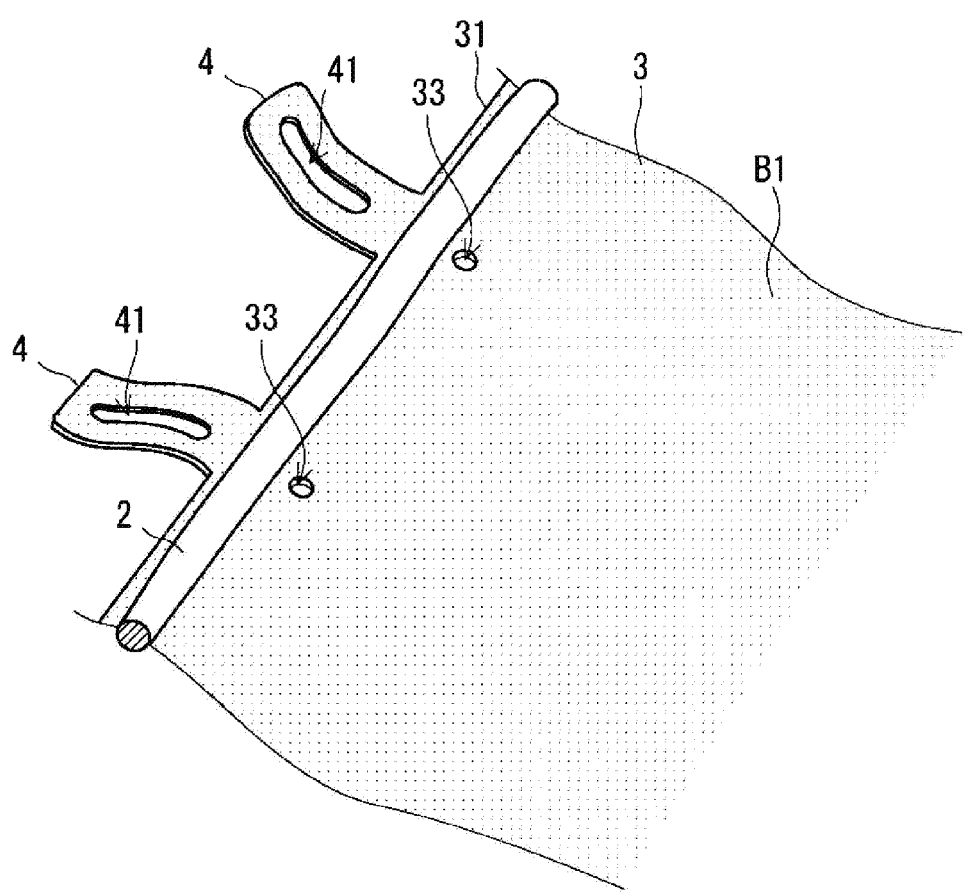
FIG. 2 is a perspective view illustrating a reverse face of a carpet main body.
Figure 3:
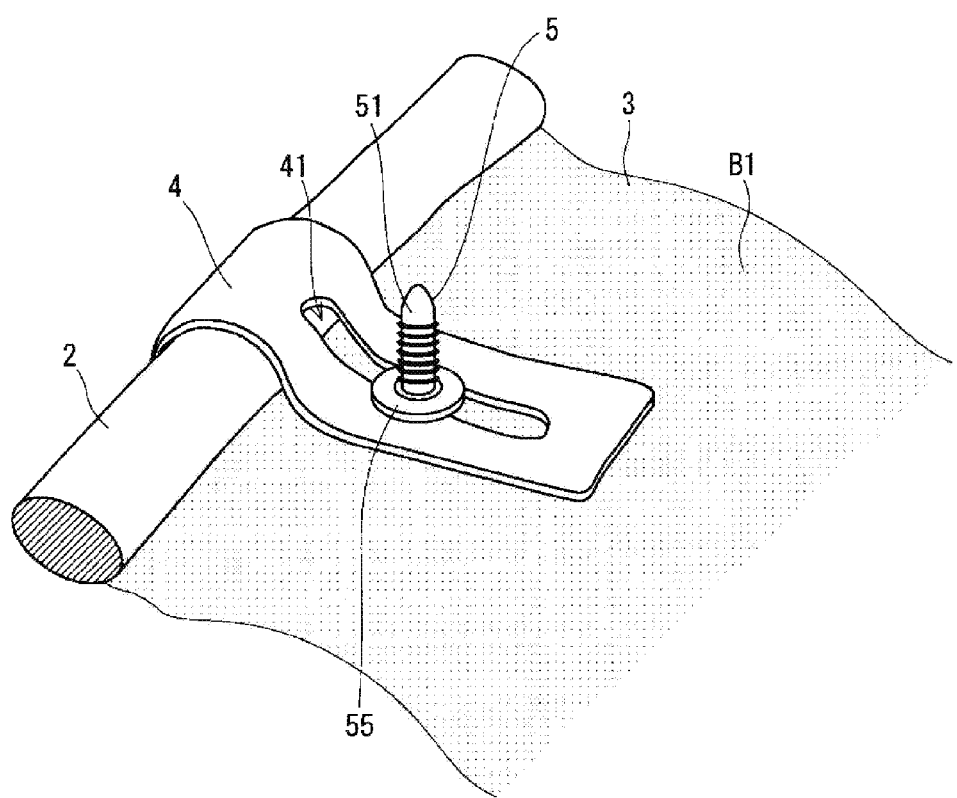
FIG. 3 is a perspective view illustrating the reverse face of the carpet main body to which a wire harness is attached.

FIG. 1 is a cross-sectional, expanded view of an edge portion of a carpet with wire harness 1 according to the embodiment. In addition, FIG. 2 is a perspective view illustrating a reverse face B1 of a carpet main body 3. Furthermore, FIG. 3 is a perspective view illustrating the reverse face B1 of the carpet main body 3 to which a wire harness 2 is attached.

The carpet with wire harness 1 is made an integral member by joining the wire harness 2 with the carpet main body 3. The carpet with wire harness 1 is attached to a vehicle body panel 9, such as a locker panel, installed on a cabin interior side of a vehicle such as an automobile.

The carpet with wire harness 1 includes the wire harness 2, the carpet main body 3, a plurality of retaining tabs 4, and a plurality of attachment portions 5.

Although not shown in the drawings, the carpet main body 3 is a member covering a surface of the vehicle body panel 9, and has a shape corresponding to that of the vehicle body panel 9.

The retaining tab 4 is a belt-shaped portion in which a portion near a base end is connected to an edge 31 of the carpet main body 3, and is integral with the carpet main body 3. The plurality of retaining tabs 4 are wrapped around the wire harness 2, which is routed along the carpet main body 3, and the retaining tabs 4, together with the carpet main body 3, wrap up and hold the wire harness 2.

The retaining tabs 4 include a slit-shaped narrow slot 41 extending from the portion near the base end of the retaining tab 4 toward a portion near a forefront end. In the present embodiment, the narrow slot 41 extends in one direction along a length direction of the belt-shaped retaining tab 4. The attachment portion 5 is inserted into the narrow slot 41, thereby attaching the retaining tab 4 to the carpet main body 3.

The attachment portion 5 is a so-called brush clip and includes an insertion portion 51, a head 53, and a clip member 55. The attachment portion 5 may be made of resin, or may be made of metal. The clip member 55 is a separate member from the insertion portion 51 and the head 53.

The insertion portion 51 is a portion passed through the retaining tab 4 and the carpet main body 3. More specifically, the insertion portion 51 is inserted into the narrow slot 41 formed in the retaining tab 4 and a through-hole 33 formed in the carpet main body 3. A plurality of flanges spreading outward in a diameter direction of the insertion portion 51 are arranged on the insertion portion 51 in an axis direction. A width of each flange (length in a direction orthogonal to the axis direction of the insertion portion 51) is slightly larger than a width of the through-hole 33 or the narrow slot 41. Therefore, when the insertion portion 51 is inserted through the through-hole 33 or the narrow slot 41, a reverse-side peripheral edge of the through-hole 33 or the narrow slot 41 is engaged on the flange. The flange may also be configured so as to be capable of bending deformation. Accordingly, the insertion portion 51 can be readily inserted through the through-hole 33 or the narrow slot 41.

The head 53 is provided to an end of the insertion portion 51, and a top surface of the head 53 has an umbrella shape gently curved into a prominence. As shown in FIG. 1, the attachment portion 5 is inserted into the through-hole 33 of the carpet main body 3 from an obverse face F1 side of the carpet main body 3, then is inserted into the narrow slot 41 of the retaining tab 4, which has been folded back toward the reverse face B1 side of the carpet main body 3. Accordingly, an obverse-side peripheral edge of the through-hole 33 of the carpet main body 3 is engaged on the head 53.

The clip member 55 is provided to the insertion portion 51. The clip member 55 has an annular structure with a hole provided at a center thereof, through which hole the insertion portion 51 is inserted. A width of the hole formed at the center of the clip member 55 is slightly smaller than the width of the flange of the insertion portion 51. Therefore, the clip member 55 is engaged with the flange of the insertion portion 51. The carpet main body 3 and the retaining tab 4 are held between the clip member 55 and the head 53.

A plurality of pointed projections 551 having pointed tips are provided on a surface of the clip member 55 facing the head 53. When the clip member 55 is passed over the insertion portion 51, the pointed projections 551 are pressed toward the carpet main body 3 and can thus sink into the retaining tab 4. Accordingly, the carpet main body 3 and the retaining tab 4 can be firmly held between the head 53 and the clip member 55. Thus, when a foot steps on the carpet main body 3 after attachment to the vehicle body panel 9, a position of the carpet main body 3 or the retaining tab 4 can be inhibited from drifting.

In addition, as shown in FIG. 1, the attachment portion 5 is used to attach the carpet with wire harness 1 to the vehicle body panel 9. Although not depicted in detail, by inserting the insertion portion 51 into an attachment hole 91 formed in the vehicle body panel 9, the flanges of the insertion portion 51 engage with a reverse face peripheral edge of the attachment hole 91, and the carpet with wire harness 1 is attached to the vehicle body panel 9.

Next, a method of fixating the wire harness 2 to the carpet main body 3 is described in detail. First, as shown in FIG. 2, the wire harness 2 is arranged on the reverse face B1 side of the carpet main body 3 so as to follow the edge 31 of the carpet main body 3. The plurality of retaining tabs 4 are folded back on the wire harness 2 toward the carpet main body 3, and thus are overlaid on the wire harness 2.

Next, the attachment portion 5 is inserted into the narrow slot 41 at a position nearer to the forefront end of the retaining tab 4 than a portion covering the wire harness 2. Moreover, the attachment portion 5 is inserted into the through-hole 33 of the carpet main body 3. Also, as shown in FIG. 3, by attaching the clip member 55 to the insertion portion 51, the wire harness 2 is fixated with respect to the carpet main body 3.

In the present embodiment, the through-hole 33 is provided at the same position as the base end (foot) of the belt-shaped retaining tab 4 relative to a direction along the edge 31. In other words, the through-hole 33 is adjacent to the base end of the retaining tab 4 in a direction orthogonal to the direction along the edge 31. In the present embodiment, the retaining tab 4 extends in the direction orthogonal to the direction along the edge 31, and therefore the direction in which the portion near the forefront end of the retaining tab 4 is folded back matches a length direction of the retaining tab 4.

The through-hole 33 may also be provided in a position different from that of the base end of the retaining tab 4 relative to the direction along the edge 31. In such a case, the direction in which the retaining tab 4 extends from the carpet main body 3 may be tilted to match drift of the through-hole 33 relative to the base end of the retaining tab 4. Accordingly, when the retaining tab 4 is folded back and fixated by the attachment portion 5, twisting of the retaining tab 4 can be inhibited.

According to the carpet with wire harness 1 according to the present embodiment, the wire harness 2 is attached to the carpet main body 3 ahead of time. Therefore, a vehicle manufacturer can attach the carpet main body 3 and the wire harness 2 to the vehicle body panel 9 simply by inserting the attachment portion 5. Thus, a number of task steps can be reduced, and therefore manufacturing cost can be reduced. In addition, using the insertion portion 51 of that same attachment portion 5, the wire harness 2 and the carpet main body 3 can be fixated to the vehicle body panel 9. Accordingly, processing costs for components fixating the wire harness 2 and the carpet main body 3 to the vehicle body panel 9 can be controlled.

In addition, in a case where the wire harness 2 and the carpet main body 3 are each separately attached to the vehicle body panel 9, a hole for each attachment component must be provided to the vehicle body panel 9. In contrast, the present embodiment suffices with a single attachment hole 91 through which the attachment portion 5 is inserted when the wire harness 2 and the carpet main body 3 are fixated to the vehicle body panel 9. In other words, processing costs for the vehicle body panel 9 can be controlled.

In addition, in the present embodiment, the insertion portion 51 of the attachment portion 5 is inserted from the obverse face F1 toward the reverse face B1 side of the carpet main body 3, and only the head 53 remains exposed on the obverse face F1 side. Therefore, even when an impact such as being stepped on by a foot is applied to the carpet main body 3 attached to the vehicle body panel 9, the insertion portion 51 is inhibited from protruding toward the cabin, and therefore damage to the carpet main body 3 is inhibited.

[2. Modification]

In the preceding, an embodiment was described; however, the present invention is not limited to the above description and various modifications are also possible.

For example, in the above-described embodiment, one narrow slot 41 is formed on one retaining tab 4. However, a plurality of through-holes may also be formed on one retaining tab 4. For example, when a plurality of through-holes are provided so as to be aligned in the length direction of the retaining tab 4, wire harnesses of different girths can be accommodated by inserting the attachment portion 5 into the appropriate through-hole, of the plurality of through-holes, for the girth of the wire harness 2.

In addition, in the above-described embodiment, the retaining tab 4 has a belt shape; however, the shape of the retaining tab 4 is not limited to this. For example, the retaining tab 4 may also be formed in an elongated shape following the edge 31 of the carpet main body 3. A plurality of narrow slots similar to the narrow slot 41 may also be provided to such an elongated retaining tab along the edge 31, and the attachment portions 5 may be inserted through all or a portion of the narrow slots. Accordingly, the elongated retaining tab can be fixated at a plurality of locations, and therefore the wire harness 2 can be held appropriately.

In addition, the retaining tab 4 is provided integrally with the carpet main body 3; however, the retaining tab 4 may also be a separate component. For example, when the retaining tab 4 is a separate component, a configuration may be employed in which, the portion near the base end of the retaining tab 4 is connected to the carpet main body 3 by also inserting the insertion portion 51 through the portion near the base end of the retaining tab 4. However, as in the above-described embodiment, forming the retaining tab 4 to be integral with the carpet main body 3 is advantageous in that a task of connecting the portion near the base end of the retaining tab 4 to the carpet main body 3 can be eliminated.

In addition, in the above-described embodiment, the retaining tab 4 is provided to the edge 31 of the carpet main body 3. However, the retaining tab 4 may also be provided to positions other than the edge 31 of the carpet main body 3. For example, by providing the retaining tab 4 as a separate component from the carpet main body 3, the retaining tab 4 can be attached at any position on the carpet main body 3.

In addition, in the above-described embodiment, by attaching the clip member 55 to the insertion portion 51 of the attachment portion 5, the carpet main body 3 and the retaining tab 4 are configured to be held between the head 53 and the clip member 55. However, when the retaining tab 4 can be engaged by the plurality of flanges provided to the insertion portion 51, for example, the clip member 55 can also be omitted.

In addition, in the above-described embodiment, holes through which the insertion portion 51 of the attachment portion 5 is inserted (the through-holes 33 and the narrow slots 41) are formed in the carpet main body 3 and the retaining tab 4. However, instead of forming holes, a slit may be provided in the carpet main body 3 or the retaining tab 4, for example, and the attachment portion 5 may be inserted through the slit. In addition, instead of forming holes, the tip of the insertion portion 51 may be sharpened and may pierce and pass through the carpet main body 3 and retaining tab 4. In this case, the retaining tab 4 can be fixated at any position on the carpet main body 3.

In the above, the present invention is described in detail. However, the above description is in all respects exemplary and the present invention is not limited by the description. Numerous modifications not given as examples are understood to be conceivable without departing from the scope of the present invention.

DESCRIPTION OF REFERENCE NUMERALS

1 Carpet with wire harness
2 Wire harness
3 Carpet main body
31 Edge
33 Through-hole
4 Retaining tab
41 Narrow slot
5 Attachment portion 51 Insertion portion
53 Head
55 Clip member
551 Pointed projection
9 Vehicle body panel
91 Hole
B1 Reverse face
F1 Obverse face

The invention claimed is:

1. A carpet with wire harness attached to a vehicle body panel, the carpet with wire harness comprising:
a carpet main body;
a wire harness arranged on the carpet main body;
a retaining tab having a portion near a base end connected to the carpet main body, the retaining tab together with the carpet main body wrapping up and holding the wire harness by folding back a portion near a forefront end of the retaining tab; and
an attachment portion attaching the retaining tab to the carpet main body, the attachment portion including an inserter inserted through the carpet main body and a portion of the retaining tab nearer to the forefront end than the portion covering the wire harness,
wherein the carpet main body is attached to the vehicle body panel by the inserter inserted through the vehicle body panel.

2. The carpet with wire harness according to claim 1, wherein a portion of the retaining tab near the base end is integral with the carpet main body.

3. The carpet with wire harness according to claim 1, wherein a through-hole is formed in the carpet main body,
a narrow slot extending at least from near the base end of the retaining tab toward the forefront end is formed in the retaining tab, and
the inserter is inserted through the through-hole and the narrow slot.

4. The carpet with wire harness according to claim 1, wherein the attachment portion further comprises:
a plate-shaped head provided to a base end side of the inserter; and
a clip portion attached to the inserter and holding the carpet main body and the retaining tab between the clip portion and the head.

5. The carpet with wire harness according to claim 4, wherein a pointed projection is provided to a surface of the clip portion facing the head.

6. The carpet with wire harness according to claim 4, wherein the head is arranged on an obverse side of the carpet main body.

7. A manufacturing method of a carpet with wire harness attached to a vehicle body panel, the method comprising:
wrapping up a wire harness arranged on a carpet main body using the carpet main body and a retaining tab having a portion near a base end connected to the carpet main body; and
attaching the retaining tab to the carpet main body by inserting an inserter through the carpet main body and a portion of the retaining tab nearer to a forefront end than the portion covering the wire harness,
wherein the carpet main body is attached to the vehicle body panel by inserting the inserter through a hole formed in the vehicle body panel.

8. A carpet with wire harness attached to a vehicle body panel, the carpet with wire harness comprising:
a carpet main body;
a wire harness arranged on the carpet main body;
a retaining tab having a portion near a base end connected to the carpet main body, the retaining tab together with the carpet main body wrapping up and holding the wire harness by folding back a portion near a forefront end of the retaining tab; and
an attachment portion attaching the retaining tab to the carpet main body by passing an insertion portion of the attachment portion through the carpet main body and a portion of the retaining tab nearer to the forefront end than the portion covering the wire harness,
wherein the carpet main body is attached to the vehicle body panel by inserting the insertion portion through the vehicle body panel,
wherein a portion of the retaining tab near the base end is integral with the carpet main body.

9. A carpet with wire harness attached to a vehicle body panel, the carpet with wire harness comprising:
a carpet main body;
a wire harness arranged on the carpet main body;
a retaining tab having a portion near a base end connected to the carpet main body, the retaining tab together with the carpet main body wrapping up and holding the wire harness by folding back a portion near a forefront end of the retaining tab; and
an attachment portion attaching the retaining tab to the carpet main body by passing an insertion portion of the attachment portion through the carpet main body and a portion of the retaining tab nearer to the forefront end than the portion covering the wire harness,
wherein the carpet main body is attached to the vehicle body panel by inserting the insertion portion through the vehicle body panel,
wherein a through-hole is formed in the carpet main body,
a narrow slot extending at least from near the base end of the retaining tab toward the forefront end is formed in the retaining tab, and
the insertion portion is inserted through the through-hole and the narrow slot.

* * * * *